US010523711B2

(12) United States Patent
Vagelos

(10) Patent No.: US 10,523,711 B2
(45) Date of Patent: Dec. 31, 2019

(54) NETWORK FILTERING SERVICE SYSTEM AND PROCESS

(71) Applicant: TracFone Wireless, Inc., Miami, FL (US)

(72) Inventor: Theodore Vagelos, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 132 days.

(21) Appl. No.: 15/183,070

(22) Filed: Jun. 15, 2016

(65) Prior Publication Data

US 2017/0366578 A1    Dec. 21, 2017

(51) Int. Cl.
| | | |
|---|---|---|
| *H04L 29/06* | (2006.01) | |
| *H04W 12/06* | (2009.01) | |
| *H04W 12/08* | (2009.01) | |

(52) U.S. Cl.
CPC .......... *H04L 63/20* (2013.01); *H04L 63/0227* (2013.01); *H04L 63/0853* (2013.01); *H04L 63/101* (2013.01); *H04W 12/06* (2013.01); *H04W 12/08* (2013.01)

(58) Field of Classification Search
CPC ..... H04L 63/20; H04L 63/0236; H04L 63/08; H04L 63/10; H04L 63/0218; H04W 80/04
USPC ........................................................... 726/1
See application file for complete search history.

(56) References Cited

U.S. PATENT DOCUMENTS

| | | | | |
|---|---|---|---|---|
| 5,987,611 | A  * | 11/1999 | Freund .................. | G06F 21/552 726/4 |
| 6,606,659 | B1 * | 8/2003 | Hegli ...................... | H04L 29/06 709/225 |
| 9,912,664 | B1 * | 3/2018 | Lam ........................ | G06F 21/10 |
| 2003/0105863 | A1 * | 6/2003 | Hegli ..................... | H04L 63/10 709/225 |
| 2003/0110168 | A1 * | 6/2003 | Kester ............... | G06F 17/30864 |
| 2003/0154401 | A1 * | 8/2003 | Hartman ............... | H04L 63/102 726/30 |
| 2003/0196105 | A1 * | 10/2003 | Fineberg ............. | H04L 63/0272 726/4 |
| 2004/0255167 | A1 * | 12/2004 | Knight ................... | G06Q 10/10 726/24 |
| 2005/0009499 | A1 * | 1/2005 | Koster ................. | H04M 15/00 455/406 |
| 2006/0021031 | A1 * | 1/2006 | Leahy .................. | C12N 5/0636 726/22 |
| 2006/0165040 | A1 * | 7/2006 | Rathod .................. | G06Q 10/10 370/335 |
| 2008/0104663 | A1 * | 5/2008 | Tokutani ............. | G06F 21/6218 726/1 |

(Continued)

*Primary Examiner* — Syed A Zaidi
(74) *Attorney, Agent, or Firm* — BakerHostetler

(57) ABSTRACT

A process of filtering a wireless service provided to at least one wireless device from a wireless network includes receiving identification of the at least one wireless device in a filtering server from an administrator and receiving filtering instructions from the administrator in the filtering server. The process further including receiving a request for an internet resource from at least one wireless device, comparing the request for the internet resource to the filtering instructions based on the time of day and day of week to determine whether the requested internet resource is allowable in view of the filtering instructions or not allowed based on the filtering instructions. The disclosure also provides a system as well.

20 Claims, 6 Drawing Sheets

(56) References Cited

U.S. PATENT DOCUMENTS

| | | | | |
|---|---|---|---|---|
| 2008/0134282 A1* | 6/2008 | Fridman | ............... | G06Q 10/10 |
| | | | | 726/1 |
| 2008/0320577 A1* | 12/2008 | Larduinat | ............... | G06F 21/34 |
| | | | | 726/9 |
| 2009/0112722 A1* | 4/2009 | Williams | ............... | G06Q 10/10 |
| | | | | 705/346 |
| 2013/0040629 A1* | 2/2013 | Sprigg | ............... | H04W 4/001 |
| | | | | 455/419 |
| 2013/0297498 A1* | 11/2013 | Nazaret | ............... | G06Q 20/14 |
| | | | | 705/40 |
| 2014/0089673 A1* | 3/2014 | Luna | ............... | H04L 63/0861 |
| | | | | 713/186 |
| 2015/0135261 A1* | 5/2015 | Park | ............... | H04L 63/102 |
| | | | | 726/1 |
| 2015/0188949 A1* | 7/2015 | Mahaffey | ............... | H04L 63/20 |
| | | | | 726/1 |
| 2015/0256545 A1* | 9/2015 | Dotterer, III | ............... | H04L 63/10 |
| | | | | 726/1 |
| 2016/0294775 A1* | 10/2016 | Mahadik | ............... | H04L 63/0236 |

\* cited by examiner

NETWORK FILTERING SERVICE SYSTEM AND PROCESS

BACKGROUND OF THE DISCLOSURE

1. Field of the Disclosure

This disclosure relates generally to a network filtering service system for two or more wireless users. This disclosure also relates generally to a network filtering service process for two or more wireless users.

2. Related Art

Many companies provide mobile devices and wireless service to their employees in order for these employees to have telecommunication capability to accomplish and/or enhance their job function. These companies want to increase efficiency of the employees by providing the mobile devices and wireless service. However, employees may have a tendency to use the mobile devices and wireless service for noncompany related activities. This can be detrimental as it reduces employee efficiency and/or productivity. Moreover, employees may use the mobile devices and wireless service for noncompany related activities in a manner that distracts them from their job function in a manner that may be hazardous. For example, using the mobile devices during driving, operation of heavy machinery, or the like. Additionally, as the company may be paying for the wireless service, extraneous use of the wireless service by the employee may result in additional cost to the company.

Accordingly, there is a need for companies to be able to control functionality and/or limit functionality of mobile devices and/or wireless services to increase employee efficiency and productivity, reduce costs, and/or reduce potential hazards.

SUMMARY OF THE DISCLOSURE

The foregoing needs are met, to a great extent, by the disclosure, with a process and system for implementing wireless services that include network filtering.

In one or more aspects, a process of filtering a wireless service provided to at least one wireless device from a wireless network includes receiving identification of the at least one wireless device in a filtering server from an administrator, receiving filtering instructions from the administrator in the filtering server, receiving a request for an internet resource from at least one wireless device, comparing the request for the internet resource to the filtering instructions to determine whether the requested internet resource is allowable in view of the filtering instructions or not allowed based on the filtering instructions, providing the internet resource to the wireless device if the requested internet resource is allowable based on the filtering instructions, and denying the internet resource to the wireless device if the requested internet resource is not allowed based on the filtering instructions.

In another aspect, a wireless network system filtering a wireless service provided to at least one wireless device from a wireless network includes a filtering server configured to receive identification of the at least one wireless device from an administrator, the filtering server further configured to receive filtering instructions from the administrator, the filtering server further configured to receive a request for an internet resource from at least one wireless device, the filtering server further configured to compare the request for the internet resource to the filtering instructions to determine whether the requested internet resource is allowable in view of the filtering instructions or not allowed based on the filtering instructions, the filtering server further configured to provide the internet resource to the wireless device if the requested internet resource is allowable based on the filtering instructions, and the filtering server further configured to deny the internet resource to the wireless device if the requested internet resource is not allowed based on the filtering instructions.

There has thus been outlined, rather broadly, certain aspects of the disclosure in order that the detailed description thereof may be better understood herein, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
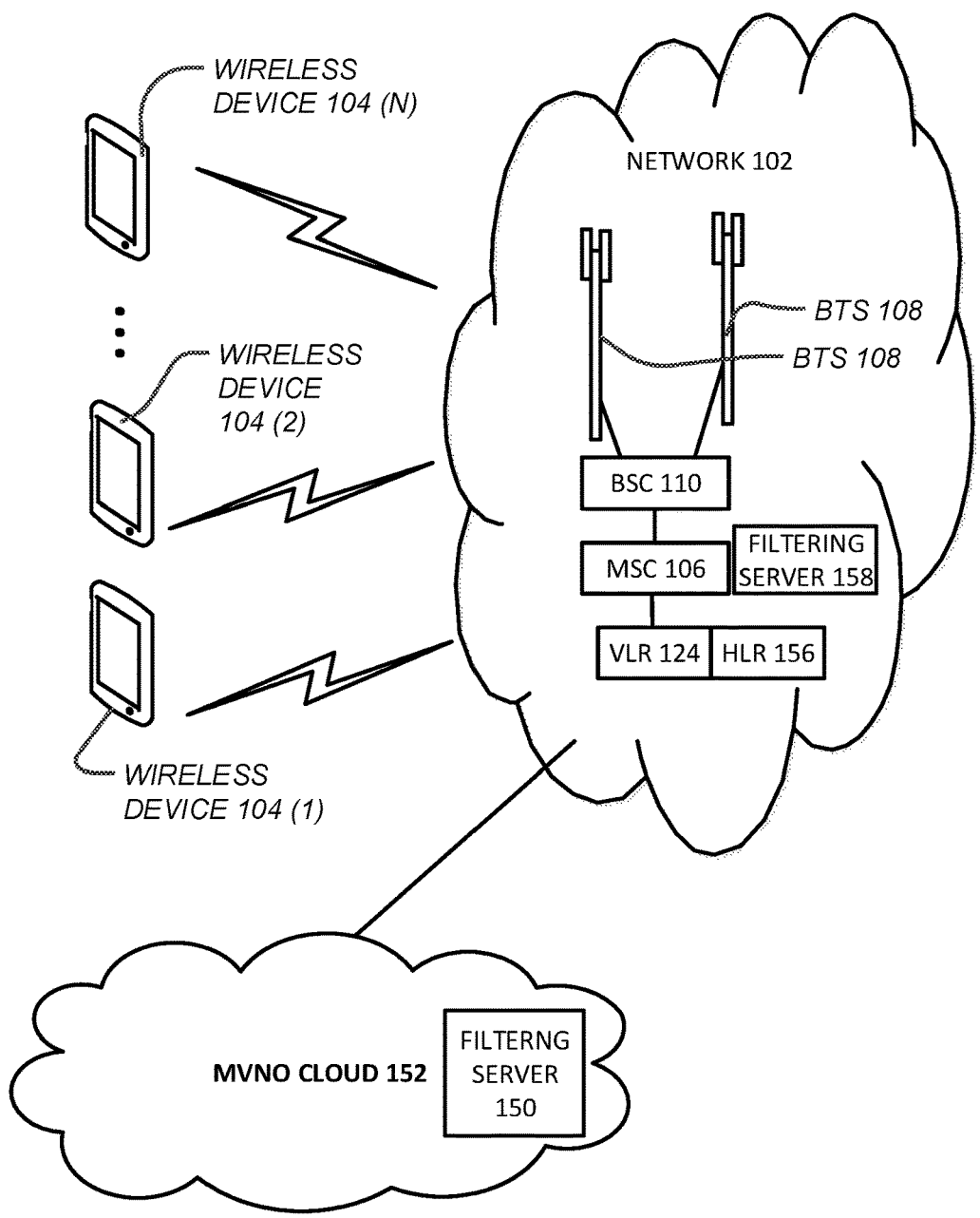
FIG. 1 shows a mobile network, a wireless device, a mobile network operator, and a mobile virtual network operator in accordance with aspects of the disclosure.

Some telecommunication companies that provide wireless services, such as mobile phone service, can be wireless carriers or Mobile Network Operators (MNOs) that maintain, operate, and control their own wireless networks and typically have control of their own frequency spectrum. An MNO relies heavily on backend systems to address any provisional, billing, security and data issues that might threaten the health of their networks.

A Mobile Virtual Network Operator (MVNO) is a mobile operator that typically does not own its own frequency spectrum and typically does not have its own network infrastructure. Instead, MVNOs have business arrangements and contracts with third party wireless carriers to purchase usage of their networks (e.g., minutes of voice calls, volume of data transfer, number of SMS, service days, etc.) that the MVNOs in turn sell to their own customers.

Aspects of the disclosure are applicable to both a MNO implementation and a MVNO implementation. However, the disclosure will focus on a MVNO implementation for brevity. Nevertheless, the various aspects of the disclosure are equally applicable to a MNO implementation.

Reference in this specification to a "wireless device" is intended to encompass any compatible wireless technology computing device that connects to a wireless communication network, such as mobile phones, mobile equipment, hotspots, wearable devices, mobile stations, user equipment, cellular phones, fixed wireless devices, smartphones, handsets or the like (e.g., APPLE® IPHONE®, IPAD®, GOOGLE® ANDROID® based devices, BLACKBERRY® based devices, other types of PDAs or smartphones), wireless modems and dongles, machine-to-machine (M2M) devices, wireless radio modules, or other wireless computing devices. The term "wireless device" may be interchangeably used and referred to herein as "wireless handset," "handset," "mobile device," "device," "mobile phones," "mobile equipment," "mobile station," "user equipment," "dongle," "radio module," "M2M device," "cellular phone," "smartphones," "mobile hotspots," "wearable devices," or "phone." Further, reference in this specification to a "wireless network" or "network" is intended to encompass any type of wireless network used to provide mobile phone or data services through the use of a wireless device, such as the Global System for Mobile Communication (GSM) network, Code-Division Multiple Access (CDMA) network, 4G-LTE, 5G, a communication channel as defined herein, or the like, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

The following acronyms used herein will be defined as follows:
  BSC—Base Station Controller
  BTS—Base Transceiver Station
  CDMA—Code-Division Multiple Access
  ESN—Electronic Serial Number
  GSM—Global System for Mobile communication
  HLR—Home Location Register
  ICCID—Integrated Circuit Card Identification
  IMEI—International Mobile Equipment Identity
  IMSI—International Mobile Subscriber Identity
  LAI—Local Area Identity
  LTE—Long Term Evolution
  [M2M]—Machine-2-Machine
  MSC—Mobile services Switching Center
  MVNO—Mobile Virtual Network Operator
  SMS—Short Message Service
  UICC—Universal Integrated Circuit Card or SIM
  UMTS—Universal Mobile Telecommunications Service
  VLR—Visitor Location Register Reference in the specification to a "company" is meant to refer to any entity that is providing some administrative oversight to a plurality of wireless users associated with the entity. Company can mean an organization, a school, a government agency, a group of individuals, an organized body of people with a particular purpose, a business, a society, an association, and the like. Company can also mean a parent or group of parents. Accordingly, reference to a company is for brevity only.

FIG. 1 shows a mobile network, a wireless device, a mobile network operator, and a mobile virtual network operator in accordance with aspects of the disclosure. In particular, FIG. 1 shows the details of a mobile network 102, a plurality of wireless devices 104(1)-104(n) (where n is any whole number), and a mobile virtual network operator (MVNO) cloud 152 in accordance with aspects of the disclosure. The disclosure may use a network filtering server 150 that may reside in the MVNO cloud 152 or may be stand-alone. The network filtering server 150 may be implemented as a server, computer, system, distributed processing system, cloud-based system or the like, or a plurality of the same.

In one aspect, the network filtering server 150 may be implemented as Software as a Service (SaaS). In one aspect, the SaaS may be implemented as a software licensing and delivery model in which software may be licensed on a subscription basis and is centrally hosted. For example, centrally hosted in the network filtering server 150. In one aspect, the SaaS implementation of the network filtering server 150 may be accessed by users (administrators of the company providing wireless service) using a web browser. In another aspect, the SaaS implementation of the network filtering server 150 may be accessed by users using a thin client via a web browser. In one aspect, the SaaS implementation of the network filtering server 150 may be based on a multitenant architecture. In this aspect, a single version of the application with a single configuration may be implemented. The single configuration may include hardware, network, operating system, and the like for all users ("tenants"). To support scalability, the application may be installed on multiple servers and/or machines.

The MVNO cloud 152 may be implemented as a network, internet cloud, server, computer, system, distributed processing system, cloud-based system or the like. The network filtering server 150 may be responsible for one or more of filtering, provisioning, metering, and consolidating information for the wireless subscribers of wireless devices such as the wireless device 104. The network filtering server 150 may be configured to implement the further functionality as described in further detail below.

Alternatively or additionally, the disclosure may use a network filtering server 158 that may reside in the mobile network 102. The network filtering server 158 may be implemented as a server, computer, system, distributed processing system, cloud-based system or the like, or a plurality of the same. The network filtering server 158 may be responsible for one or more of filtering, provisioning, metering, and consolidating information for the wireless devices such as the wireless device 104. The network filtering server 158 may be configured to implement the further functionality as described in further detail below. In one aspect, the network filtering server 158 may be implemented as Software as a Service (SaaS) implemented as described above.

Alternatively or additionally, the disclosure may utilize a network filtering client 154 that may be associated with the wireless device 104. The network filtering client 154 may be pre-installed or post-installed on the wireless device 104. In one aspect, the network filtering client 154 may be an application downloaded and installed into the wireless device 104. In one aspect, the network filtering client 154 may be an application available through distribution platforms called app stores, such as the Apple App Store, Google Play, Windows Phone Store, BlackBerry App World, and the like.

The network filtering client 154 may filter usage of the wireless device 104. In particular, the network filtering client 154 may receive data from the network filtering server 150 and/or the network filtering server 158 for implementation of a filtering process. In one aspect, part of the process 300 and part of the process 400 may be implemented in the network filtering client 154 and other parts of the process 300 and parts of the process 400 may be implemented in the network filtering server 150 and/or the network filtering server 158. Additionally, the network filtering server 150 and/or the network filtering server 158 may send parameters for the filtering process implemented by the network filtering client 154. Moreover, the network filtering client 154 may send notifications to the network filtering server 150 and/or the network filtering server 158 indicating that the filtering process is being implemented. The network filtering client 154 may be configured to implement the further functionality as described in further detail below.

FIG. 1 further shows that the mobile network 102 may include a Mobile services Switching Center (MSC) 106 that may perform the switching of calls and that may include a Visitor Location Register (VLR) 124. The mobile network 102 may also include a Base Transceiver Station (BTS) 108 and a Base Station Controller (BSC) 110. The base transceiver station 108 houses the radio transceivers that define a cell and handle the radio-link protocols with the wireless device 104. The base station controller 110 manages the radio resources for one or more base transceiver stations 108. The base station controller 110 is the connection between the wireless device 104 and the Mobile service Switching Center (MSC) 106.

A Home Location Register (HLR) 156 and the VLR 124 together with the MSC 106, provide the call-routing and roaming capabilities. The HLR 156 contains all the administrative information of each subscriber registered in the corresponding mobile network 102, along with the current location of the wireless device 104. The above is an exemplary implementation of the mobile network 102. Other types of networks utilizing other types of protocols may be implemented as well and are contemplated by the disclosure.

In the following description, particular example is made of the wireless device 104, however, wireless devices 104(1)-104(*n*) may each include some or all of the elements/functionality described with respect to the wireless device 104.

Figure 2:
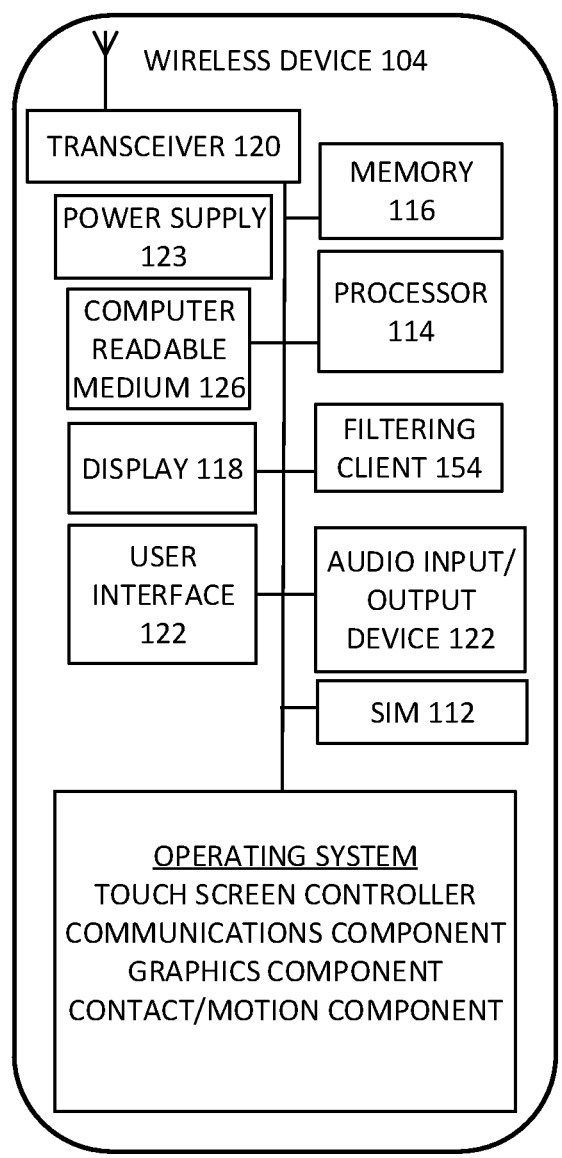
FIG. 2 shows the details of a wireless device in accordance with aspects of the disclosure.
Figure 4:
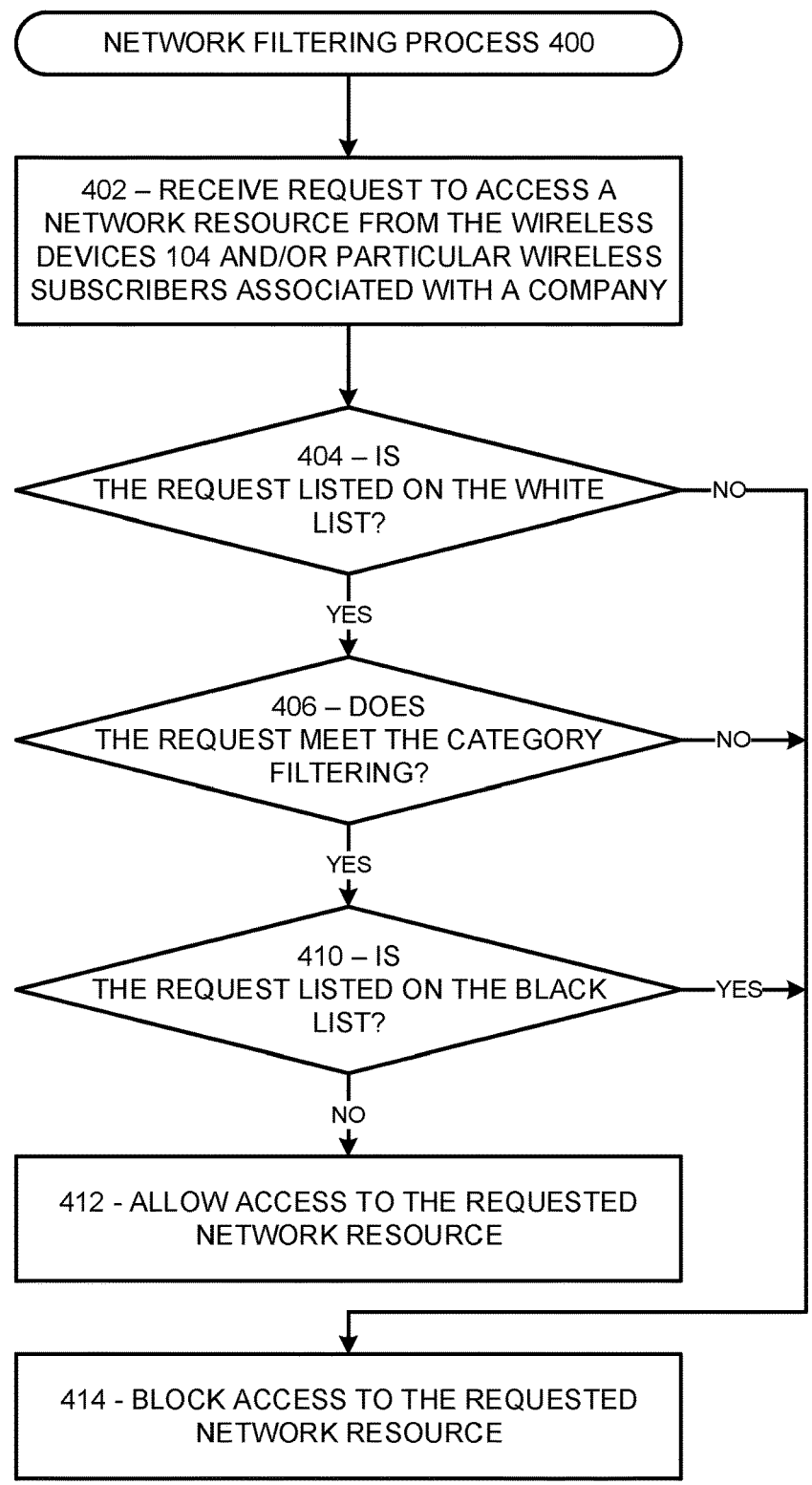
FIG. 4 shows further network filtering processes in accordance with aspects of the disclosure.

FIG. 2 shows the details of a wireless device in accordance with aspects of the disclosure. As shown in FIG. 4, the wireless device 104 provides the radio and signal processing needed to access the mobile network 102 for wireless services. The wireless device 104 may include a processor 114, memory 116, display 118, transceiver 120, user interface 122, computer readable medium 126, and the like as is known in the art. The processor 114 may be configured to process call functions, provide wireless data including Internet access, provide other services to the user, and may also execute any programs including the network filtering client 154 if utilized in one of the particular aspects described herein.

It should be noted that the network filtering client 154 may also be stored on or execute, at least in part, on a Subscriber Identification Module (SIM) or Universal Integrated Circuit Card (UICC) (Hereinafter generically referred to as a SIM 112), on dedicated hardware including semiconductors, application specific integrated circuits (ASIC), programmable logic arrays, the processor 114, and other hardware devices. The network filtering client 154 may also execute partially or completely on the mobile network 102 and/or any other network including any form of cloud computing and the like. The network filtering client 154 may also execute partially or completely in the MVNO cloud 152.

In arrangements that use a SIM 112, the SIM 112 may be associated with the wireless device 104. The SIM 112 may be an integrated circuit that stores information and/or data such as an International Mobile Subscriber Identity (IMSI) and also may store a key used to identify and authenticate subscribers on the wireless device 104 and other devices. The SIM 112 may be configured to be transferred between different wireless devices. The SIM 112 may also store network-specific information used to authenticate and identify subscribers on the mobile network 102.

Figure 3:
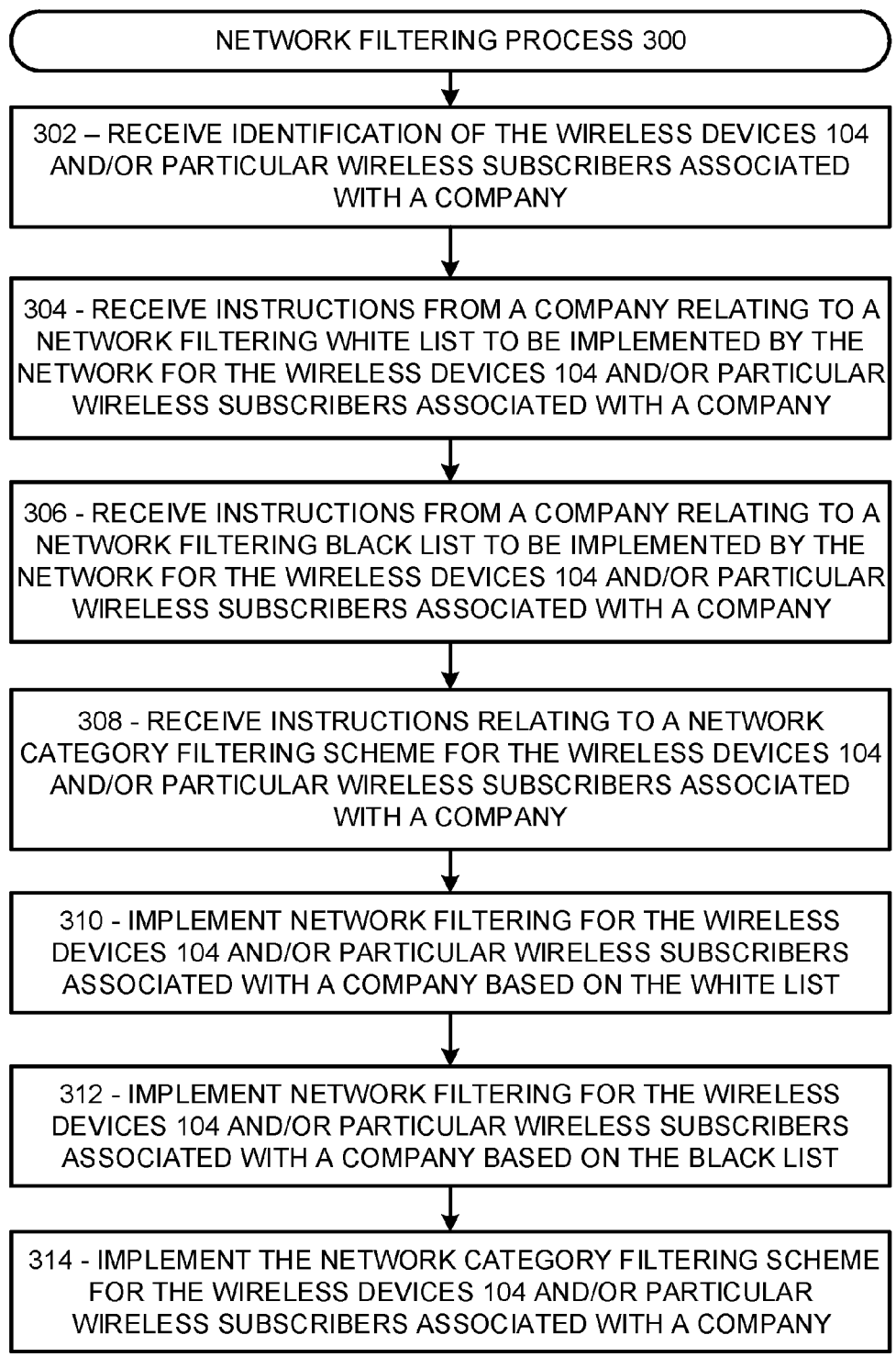
FIG. 3 shows network filtering processes in accordance with aspects of the disclosure.

FIG. 3 shows the network filtering processes in accordance with aspects of the disclosure. As described above, the network filtering client 154, the network filtering server 150, and/or the network filtering server 150 may operate to filter wireless usage of the wireless devices 104(1)-104(*n*). For brevity, the network filtering client 154, the network filtering server 150, and/or the network filtering server 150 will be referred to hereinafter as a filtering component. In this regard, the process and functionality described for the filtering component may be included in one or more of the network filtering client 154, the network filtering server 150, and/or the network filtering server 150.

The filtering component may include an aspect for the company or a company wireless administrator (hereinafter company administrator) to set up the filtering component to be applied to the wireless service provided to company employees. In particular, the filtering component may implement one or more processes to: identify 302 the wireless devices 104 and/or particular wireless subscribers associated with a company; receive instructions 304 from a company relating to a network filtering white list to be implemented by the network for the wireless devices 104 and/or particular wireless subscribers associated with a company; receive instructions 306 from a company relating to a network filtering black list to be implemented by the network for the wireless devices 104 and/or particular wireless subscribers associated with a company; receive instructions 308 relating to a network category filtering scheme for the wireless devices 104 and/or particular wireless subscribers associated with a company; implement network filtering 310 for the wireless devices 104 and/or particular wireless subscribers associated with a company based on the white list; implement network filtering 312 for the wireless devices 104 and/or particular wireless subscribers associated with a company based on the black list; and implement the network category filtering scheme 314 for the wireless devices 104 and/or particular wireless subscribers associated with a company. It should be noted that not all processes need to be executed. Black listed URLs may reference web pages (http), file transfer (ftp), email (mailto), database access (JDBC), Internet Protocol version 4 (IPv4) addresses, Internet Protocol version 6 (IPv6) addresses, and many other identifiers that should be blocked. Once the filtering component receives the black list information, the black list information may be stored in a database associated with the filtering component. The black list may be a list or register of URLs or Internet Protocol addresses where access is blocked. For example, only the portions of the black list process may be implemented. On the other hand, only the portions of the white list process may be implemented.

In a particular aspect, the filtering component may receive identification 302 of the particular wireless subscribers and/or the wireless devices 104 by receiving identification information of the particular wireless subscribers and/or the wireless devices 104 from the company administrator. In particular, the information may include network-specific information as required by the network. Additionally, the filtering component may receive specific information in order to provide the MVNO and/or the MVNO cloud 152 the ability to positively identify the wireless subscriber and/or wireless device 104. The network-specific information may include for example one or more phone numbers, an Integrated Circuit Card Identification (ICCID), Electronic Serial Number (ESN), International Mobile Equipment Identity (IMEI), International Mobile Subscriber Identity (IMSI), Local Area Identity (LAI), and so on. Of course other types of information are within the spirit and scope of the disclosure. In one aspect, the company administrator may simply provide the phone number of the wireless device 104 in which the filtering component is to be applied. Once the filtering component receives the identification information, the identification information may be stored in a database associated with the filtering component.

In another aspect of process 302, the filtering component may receive identification 302 of the particular wireless subscribers and/or the wireless devices 104 by receiving identification information of the company from the company administrator. In this regard, when a company administrator logs into an account associated with the wireless devices 104, the filtering component may search a database for all wireless devices 104 associated with the company. Thereafter, the filtering component may receive identification information automatically and the identification information may be stored in a database associated with the filtering component.

In box 304, the filtering component may receive instructions from the company administrator relating to a network filtering white list to be implemented by the filtering component for the wireless devices 104 and/or particular wireless subscribers associated with a company. In this regard, the white list may be a series of valid web addresses that a company employee may access with their wireless device 104. The valid web addresses may include a Uniform Resource Locator (URL), which may be a reference to a web resource that specifies its location on a computer network and a mechanism for retrieving the resource. A URL may be a specific type of Uniform Resource Identifier (URI). A URL may imply a means to access an indicated resource. URLs may reference web pages (http), file transfer (ftp), email (mailto), database access (JDBC), Internet Protocol version 4 (IPv4) addresses, Internet Protocol version 6 (IPv6) addresses, and many other identifiers. Once the filtering component receives the white list information, the white list information may be stored in a database associated with the filtering component. The white list may be a list or register of URLs or Internet Protocol addresses that are being provided access. When white lists are deployed, the system will only provide the individual user with access to the designated white list addresses for their account.

In box 306, the filtering component may receive instructions from the company administrator relating to a network filtering black list to be implemented by the filtering component for the wireless devices 104 and/or particular wireless subscribers associated with a company. In this regard, the black list may be a series of valid web addresses that a company employee may not access with their wireless device 104. Once the filtering component receives the black list information, the black list information may be stored in a database associated with the filtering component. The black list may be a list or register of URLs or Internet Protocol address that, for one reason or another, are being denied.

In box 308, the filtering component may receive instructions from the company administrator relating to a network category filtering to be implemented by the filtering component for the wireless devices 104 and/or particular wireless subscribers associated with a company.

The category filtering may apply at least one filtering category scheme, such as an inclusive or exclusive filter, and at least one set of filtering elements, such as a list of allowed or excluded categories based on a category of filtering e.g. low filtering, medium filtering, high filtering, or the like. For example, at least one filtering category scheme may exclude social media and video streaming websites. Accordingly, a request to a social media website would not meet the category filtering. The category filtering scheme may exclude other types of websites as well.

Any one or more of the filtering processes 304, 306, and/or 308 may be implemented in a time-based manner. In this regard, the company administrator may indicate that any one of the filtering processes 304, 306, and/or 308 may be implemented either 24 hours/day, seven days per week, or in accordance with specific time-of-day/day-of-week restrictions. For example, the company administrator may indicate that the filtering processes 304, 306, and/or 308 may be implemented during working hours. Thereafter, the filtering processes 304, 306, and/or 308 may be implemented only during working hours.

In boxes 310, 312, 314 once the wireless users have been identified and stored, the black list has been identified and stored, the white list identified and stored, and/or the category filtering scheme identified and stored, the filtering component may implement network filtering for the wireless devices 104 and/or particular wireless subscribers associated with a company based on the white list, category filtering scheme, and/or black list as described in further detail below.

FIG. 4 shows network filtering process in accordance with aspects of the disclosure. In particular, FIG. 4 illustrates a network filtering process 400 implemented by the filtering component.

In box 402, the filtering component may receive request to access a network resource from the wireless devices 104 and/or particular wireless subscribers associated with a company. The network resource may be a URL or the like as described above.

Next, in box 404, the filtering component may analyze the requested network resource and determine whether the request is listed on the white list. If the requested resource is listed on the white list, then the process advances to box 406.

On the other hand, if the requested resource is not listed on the white list the process advances to box 414. In box 414, access to the requested network resource is blocked.

The user of the wireless device 104 may further receive an indication that that the requested network resource is blocked.

Next, in box 406, the filtering component may analyze the requested network resource and determine whether the request meets a category filtering. The category filtering may apply at least one filtering category scheme, such as an inclusive or exclusive filter, and at least one set of filtering elements, such as a list of allowed or excluded categories based on a category of filtering e.g. low filtering medium filtering are high filtering. If the requested resource meets the category filtering, then the process advances to box 410.

On the other hand, if the requested resource does not meet the category filtering the process advances to box 414. In box 414, access to the requested network resource is blocked. The user of the wireless device 104 may further receive an indication that that the requested network resource is blocked.

Next, in box 410, the filtering component may analyze the requested network resource and determine whether the request is listed on the black list. If the requested resource is not listed on the black list, then the process advances to box 412.

On the other hand, if the requested resource is listed on the black list, the process advances to box 414. In box 414, access to the requested network resource is blocked. The user of the wireless device 104 may further receive an indication that that the requested network resource is blocked.

Finally, the process flows to box 412 were the user of the wireless device 104 may be allowed access to the requested network resource.

Figure 5:
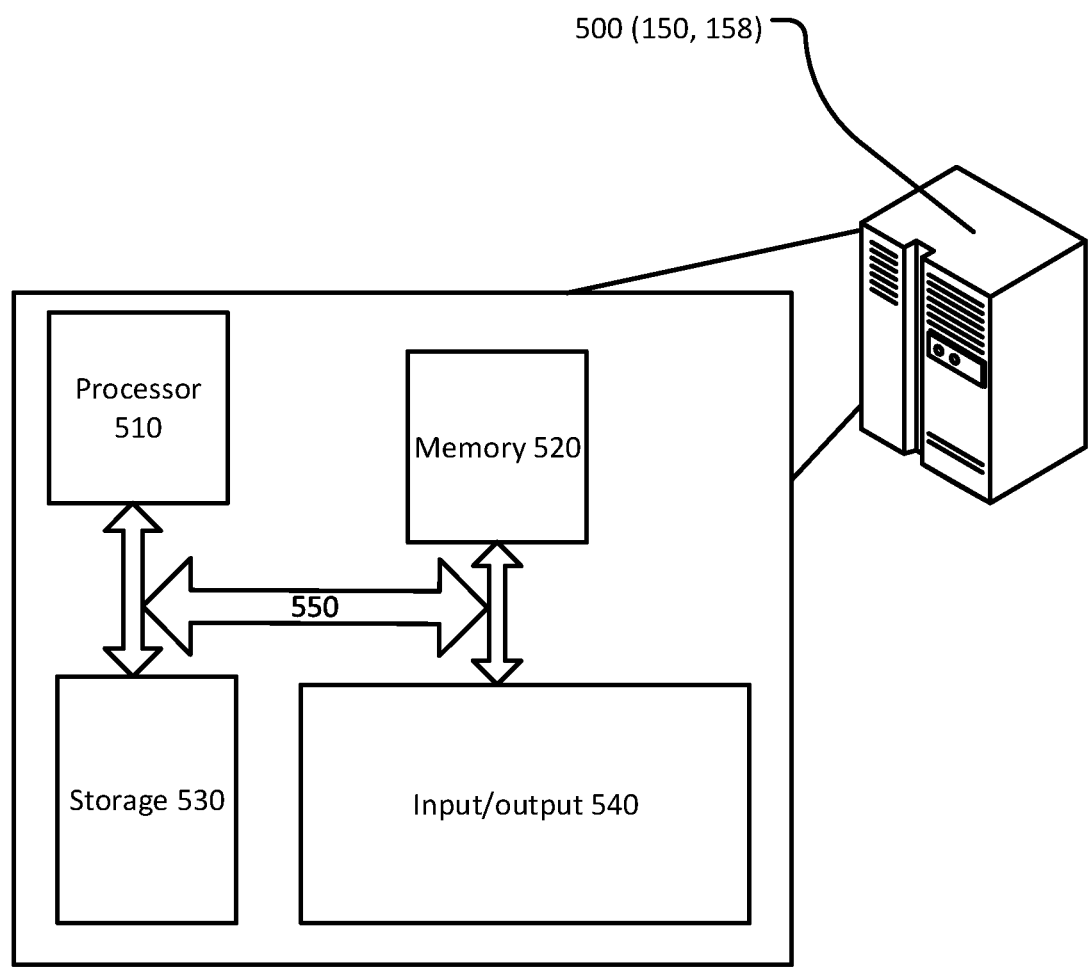
FIG. 5 shows a schematic diagram of an exemplary computer system in accordance with aspects of the disclosure.

FIG. 5 shows a schematic diagram of an exemplary computer system in accordance with aspects of the disclosure. In particular, FIG. 5 illustrates a computer system 500 that can be used to implement the network filtering server 150 and/or the network filtering server 158. In particular, the computer system 500 may operate to provide some or all of the filtering component functionality as described herein. The computer system 500 includes a processor 510, a memory 520, a storage device 530, and an input/output device 540. Each of the components 510, 520, 530, and 540 can, for example, be interconnected using a system bus 550. The processor 510 is capable of processing instructions for execution of the process 300 and/or the process 400 within the computer system 500. In one implementation, the processor 510 is a single-threaded processor. In another implementation, the processor 510 is a multi-threaded processor. The processor 510 is capable of processing instructions stored in the memory 520 or on the storage device 530 to provide communications to the wireless device 104. In some aspects, a parallel processing set of computer systems 500 connected over a network may be employed, clustered into one or more server centers.

The memory 520 stores information within the computer system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the computer system 500. In one implementation, the storage device 530 is a computer-readable medium. In various different implementations, the storage device 530 can, for example, include a hard disk device, an optical disk device, or some other large capacity storage device. The input/output device 540 provides input/output operations for the computer system 500.

Figure 6:
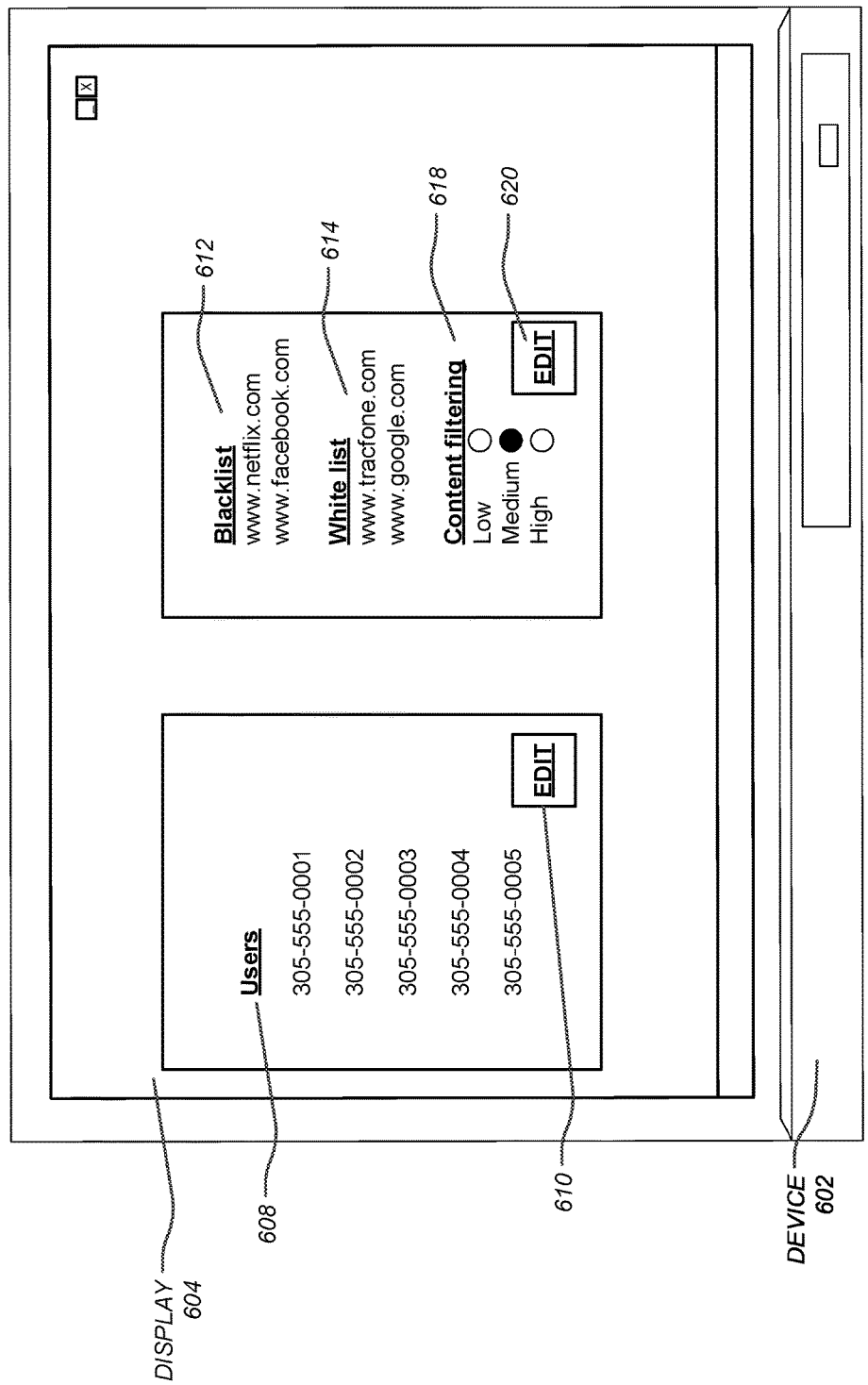
FIG. 6 shows an exemplary computer system graphical user interface in accordance with aspects of the disclosure.

FIG. 6 shows an exemplary computer system graphical user interface in accordance with aspects of the disclosure. In particular, FIG. 6 shows a device 602 such as a personal computer, laptop, or the like. The device may have a display 604 that provides the graphical user interface. The device 602 may be implemented by the company administrator to implement the process 300. The company administrator may utilize a web browser to connect to the network filtering server 150 and/or the network filtering server 158, which may include logon identification and logon password. Once the company administrator has gained access to the network filtering server 150 and/or the network filtering server 158 they may review, add, remove, users 608 by interacting with the webpage such as by clicking an edit button 610 consistent with process 302.

As shown in FIG. 6, the company administrator may interact with the device 602 and web browser to review, add, remove, white list URLs 614 by interacting with the webpage such as by clicking an edit button 620 consistent with process 304. In this regard, the company administrator has indicated a wireless provider website and a search website to be included on the white list.

As further shown in FIG. 6, the company administrator may interact with the device 602 and web browser to review, add, remove, blacklist URLs 612 by interacting with the webpage such as by clicking an edit button 620 consistent with process 306. In this regard, the company administrator has indicated a video streaming website and a social media website to be included on the black list.

Finally, the company administrator may interact with the device 602 and web browser to review and revise the categories and/or level of content filtering 618 by interacting with the webpage such as by clicking an edit button 620, clicking radio buttons, and/or the like consistent with the process 308. In this regard, as shown in FIG. 6, the administrator has selected a medium level of content filtering across all categories.

It should be noted that FIG. 6 is merely exemplary. The device 602 may connect to the network filtering server 150 and/or the network filtering server 158 in other ways, directly, indirectly, or the like. Moreover, the particular layout and information provided on the display 604 may be provided in other ways as well.

Accordingly, the disclosure provides companies the ability to control functionality and/or limit functionality of mobile devices and/or wireless services to increase employee efficiency and productivity, reduce costs, and/or reduce potential hazards. This ability is especially unique with mobile devices as they operate outside the company's network. The typical company has great control over their own network resources. Hence, the unique approach to the network filtering scheme disclosed allows a company to maintain greater control of users of the company provided wireless service which would have previously been impossible to implement.

For the purposes of this disclosure a computer readable medium stores computer data, which data can include computer program code that is executable by a processor of the SIM or mobile device, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the disclosure, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A process of filtering a wireless service provided to at least one wireless device from a wireless network for an employee of a business, the process comprising:
   implementing a filtering server in at least one of a mobile virtual network operator cloud and a mobile network operator implementing the wireless network;
   receiving identification of at least one wireless device in the filtering server from an administrator of a business;
   receiving filtering instructions from the administrator in the filtering server by time of day and day of week;
   receiving a request in the wireless network for an internet resource from at least one wireless device;
   comparing the request for the internet resource to the filtering instructions with the filtering server to determine whether the request for an internet resource is allowable in view of the filtering instructions or not allowed based on the filtering instructions;

providing the internet resource to the wireless device with the filtering server if the request for an internet resource is allowable based on the filtering instructions; and denying the internet resource to the wireless device with the filtering server if the request for an internet resource is not allowed based on the filtering instructions and sending an indication to the at least one wireless device that the request for an internet resource is not allowed, wherein the filtering instructions comprise at least one of the following: a white list of internet resources, a blacklist of internet resources, and categories of internet resources and a degree of content filtering based on said categories;

wherein the receiving identification of the at least one wireless device in the filtering server from the administrator comprises receiving business identification information through a webpage generated by the filtering server; and wherein the filtering server is configured to search a database based on the business identification information to generate the identification of the at least one wireless device utilized by an employee of the business.

2. The process of filtering a wireless service according to claim 1, wherein the filtering instructions comprise the white list of internet resources, the blacklist of internet resources, and the categories of internet resources and the degree of content filtering based on said categories; and wherein the implementing the filtering server further comprises implementing the filtering server as a Software as a Service (SaaS) implemented as a software licensing and delivery model licensed on a subscription basis.

3. The process of filtering a wireless service according to claim 1, wherein the filtering server is implemented in the wireless network by the mobile network operator; and wherein the administrator accesses the webpage generated by the filtering server using a thin client.

4. The process of filtering a wireless service according to claim 1 wherein the filtering server is at least partially implemented in part in the mobile virtual network operator cloud;

wherein the filtering server is further configured for provisioning, metering, and consolidating information for the at least one wireless device; and the filtering server is configured to filter either 24 hours/day, seven days per week, or in accordance with specific time-of-day/day-of-week restrictions.

5. The process of filtering a wireless service according to claim 1, wherein the filtering server comprises a first filtering server implemented in the mobile virtual network operator cloud separate from the wireless network;

wherein the first filtering server is further configured for provisioning, metering, and consolidating information for the at least one wireless device; and wherein the filtering server comprises a second filtering server implemented by the mobile network operator in the wireless network.

6. The process of filtering a wireless service according to claim 1, wherein the filtering instructions comprise the white list of internet resources;

wherein the filtering server is implemented in the mobile virtual network operator cloud separate from the wireless network; and wherein the filtering server is further configured for provisioning, metering, and consolidating information for the at least one wireless device.

7. The process of filtering a wireless service according to claim 1 wherein the filtering server is at least partially implemented in the mobile virtual network operator cloud;

wherein the filtering server is further configured for provisioning, metering, and consolidating information for the at least one wireless device;

wherein the filtering instructions comprises the white list of internet resources, the blacklist of internet resources, and the categories of internet resources and the degree of content filtering based on said categories;

wherein the receiving filtering instructions from the administrator in the filtering server comprises receiving the filtering instructions through the webpage generated by the filtering server; and wherein the receiving filtering instructions comprises:
  reviewing and revising the white list of internet resources,
  reviewing and revising the blacklist of internet resources, and
  reviewing and revising the categories of internet resources and the degree of content filtering based on said categories.

8. The process of filtering a wireless service according to claim 1, wherein the filtering instructions comprise the blacklist of internet resources;

wherein the filtering server is implemented in the mobile virtual network operator cloud separate from the wireless network; and wherein the implementing the filtering server further comprises implementing the filtering server as a Software as a Service (SaaS) implemented as a software licensing and delivery model licensed on a subscription basis.

9. The process of filtering a wireless service according to claim 1, wherein the receiving filtering instructions from the administrator in the filtering server comprises receiving the filtering instructions through a webpage generated by the filtering server;

wherein the implementing the filtering server further comprises implementing the filtering server as a Software as a Service (SaaS) implemented as a software licensing and delivery model licensed on a subscription basis; and wherein the receiving filtering instructions comprises:
  reviewing and revising the white list of internet resources,
  reviewing and revising the blacklist of internet resources, and
  reviewing and revising the categories of internet resources and the degree of content filtering based on said categories.

10. The process of filtering a wireless service according to claim 1, wherein the filtering instructions comprise the white list of internet resources, the blacklist of internet resources, and the categories of internet resources and the degree of content filtering based on said categories;

wherein the implementing the filtering server further comprises implementing the filtering server as a Software as a Service (SaaS) implemented as a software licensing and delivery model licensed on a subscription basis;
wherein the filtering server is further configured for provisioning, metering, and consolidating information for the at least one wireless device;
wherein the filtering server is implemented in the mobile virtual network operator cloud separate from the wireless network;
wherein the receiving filtering instructions from the administrator in the filtering server comprises receiving the filtering instructions through the webpage generated by the filtering server;
wherein the administrator accesses the webpage generated by the filtering server using a thin client; and
wherein the receiving filtering instructions comprises:
  reviewing and revising the white list of internet resources,
  reviewing and revising the blacklist of internet resources, and
  reviewing and revising the categories of internet resources and the degree of content filtering based on said categories.

11. A wireless network system filtering a wireless service provided to at least one wireless device from a wireless network for an employee of a business comprising:
  a filtering server configured to receive identification of at least one wireless device from an administrator of a business;
  the filtering server further configured to receive filtering instructions from the administrator;
  the filtering server further configured to receive a request for an internet resource from at least one wireless device;
  the filtering server further configured to compare the request for the internet resource to the filtering instructions to determine whether the request for the internet resource is allowable in view of the filtering instructions or not allowed based on the filtering instructions either 24 hours/day, seven days per week, or in accordance with specific time-of-day/day-of-week restrictions;
  the filtering server further configured to provide the internet resource to the wireless device if the request for the internet resource is allowable based on the filtering instructions; and
  the filtering server further configured to deny the internet resource to the wireless device if the request for the internet resource is not allowed based on the filtering instructions and send an indication to the at least one wireless device that the request for an internet resource is not allowed,
  wherein the filtering server is implemented in at least one of a mobile virtual network operator cloud and a mobile network operator implementing the wireless network;
  wherein the filtering instructions comprises at least one of the following: a white list of internet resources, a blacklist of internet resources, categories of internet resources and a degree of content filtering based on said categories;
  wherein the receiving identification of the at least one wireless device in the filtering server from the administrator comprises receiving business identification information through a webpage generated by the filtering server; and
  wherein the filtering server is configured to search a database based on the business identification information to generate the identification of the at least one wireless device utilized by an employee of the business.

12. The wireless network system according to claim 11, wherein the filtering instructions comprise the white list of internet resources, the blacklist of internet resources, the categories of internet resources and the degree of content filtering based on said categories; and
wherein the implementing the filtering server further comprises implementing the filtering server as a Software as a Service (SaaS) implemented as a software licensing and delivery model licensed on a subscription basis.

13. The wireless network system according to claim 11, wherein the filtering server is implemented in the wireless network by the mobile network operator; and
wherein the administrator accesses the webpage generated by the filtering server using a thin client.

14. The wireless network system according to claim 11 wherein the filtering server is at least partially implemented in the mobile virtual network operator cloud; and
wherein the filtering server is further configured for provisioning, metering, and consolidating information for the at least one wireless device.

15. The wireless network system according to claim 11, wherein the filtering server comprises a first filtering server implemented in the mobile virtual network operator cloud;
wherein the first filtering server is further configured for provisioning, metering, and consolidating information for the at least one wireless device; and
wherein the filtering server comprises a second filtering server implemented by the mobile network operator in the wireless network.

16. The wireless network system according to claim 11, wherein the filtering instructions comprise the white list of internet resources;
wherein the filtering server is implemented in the mobile virtual network operator cloud separate from the wireless network; and
wherein the filtering server is further configured for provisioning, metering, and consolidating information for the at least one wireless device.

17. The wireless network system according to claim 11 wherein the filtering server is at least partially implemented in the mobile virtual network operator cloud wherein the filtering instructions comprises the white list of internet resources, the blacklist of internet resources, and the categories of internet resources and the degree of content filtering based on said categories;
wherein the filtering server is further configured for provisioning, metering, and consolidating information for the at least one wireless device;
wherein the receiving filtering instructions from the administrator in the filtering server comprises receiving the filtering instructions through the webpage generated by the filtering server; and
wherein the receiving filtering instructions comprises:
  reviewing and revising the white list of internet resources,
  reviewing and revising the blacklist of internet resources, and reviewing and revising the categories of internet resources and the degree of content filtering based on said categories.

18. The wireless network system according to claim 11,
wherein the filtering instructions comprise the blacklist of internet resources;
wherein the filtering server is implemented in a third party wireless network separate from the wireless network; and
wherein the implementing the filtering server further comprises implementing the filtering server as a Software as a Service (SaaS) implemented as a software licensing and delivery model licensed on a subscription basis.

19. The wireless network system according to claim 11,
wherein the receiving filtering instructions from the administrator in the filtering server comprises receiving the filtering instructions through a webpage generated by the filtering server;
wherein the implementing the filtering server further comprises implementing the filtering server as a Software as a Service (SaaS) implemented as a software licensing and delivery model licensed on a subscription basis; and
wherein the receiving filtering instructions comprises:
  reviewing and revising the white list of internet resources,
  reviewing and revising the blacklist of internet resources, and
  reviewing and revising the categories of internet resources and the degree of content filtering based on said categories.

20. The wireless network system according to claim 11,
wherein the filtering instructions comprise the white list of internet resources, the blacklist of internet resources, the categories of internet resources and the degree of content filtering based on said categories;
wherein the implementing the filtering server further comprises implementing the filtering server as a Software as a Service (SaaS) implemented as a software licensing and delivery model licensed on a subscription basis;
wherein the filtering server is implemented in the wireless network by the mobile network operator;
wherein the filtering server is further configured for provisioning, metering, and consolidating information for the at least one wireless device;
wherein the receiving filtering instructions from the administrator in the filtering server comprises receiving the filtering instructions through the webpage generated by the filtering server;
wherein the administrator accesses the webpage generated by the filtering server using a thin client;
wherein the receiving filtering instructions comprises:
  reviewing and revising the white list of internet resources,
  reviewing and revising the blacklist of internet resources, and
  reviewing and revising the categories of internet resources and the degree of content filtering based on said categories.

\* \* \* \* \*